Oct. 2, 1962 Q. A. ANDERSON 3,056,515
MACHINE FOR DEPALLETIZING CANS
Filed Jan. 29, 1959 3 Sheets-Sheet 1
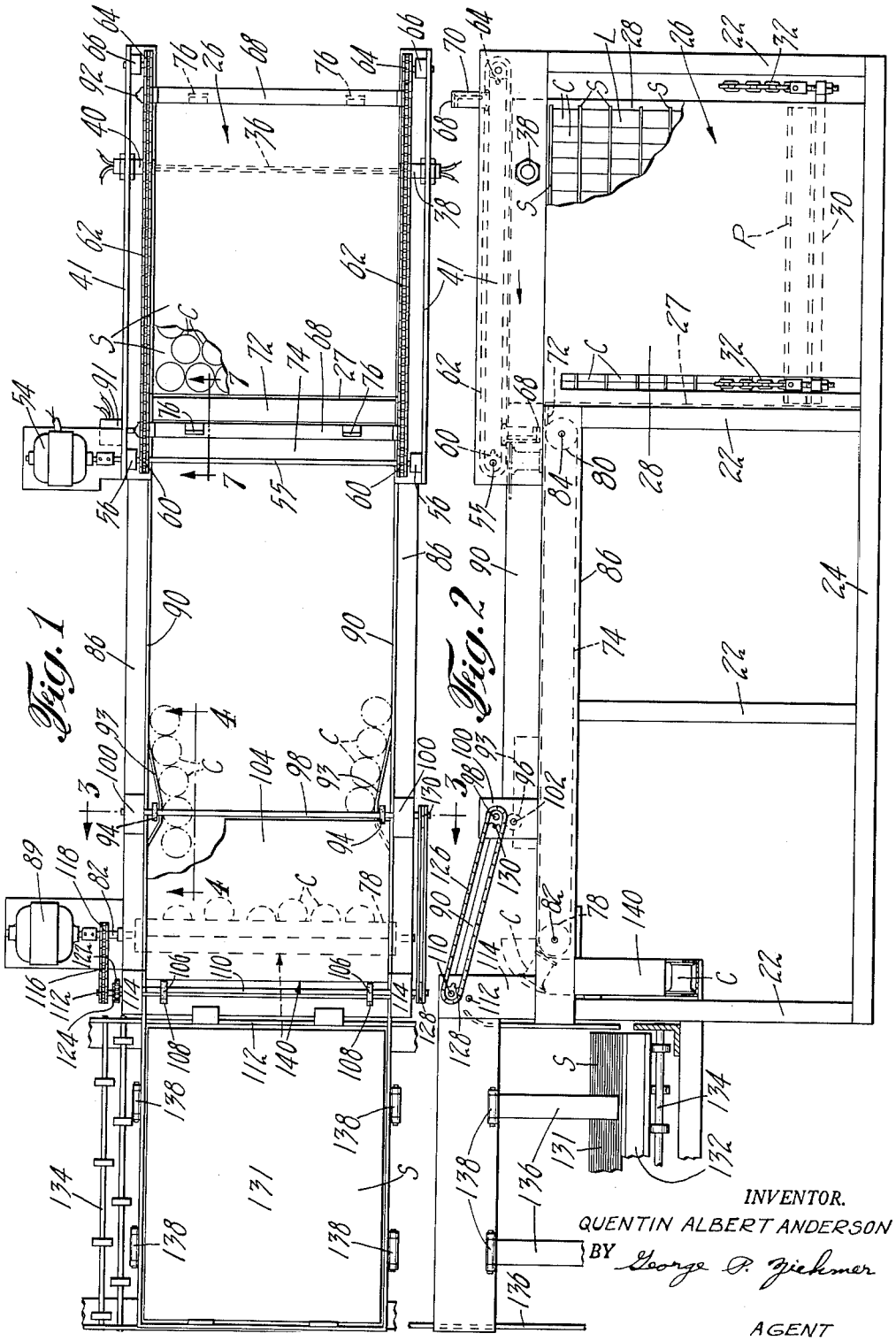
INVENTOR.
QUENTIN ALBERT ANDERSON
BY George P. Ziehmer
AGENT

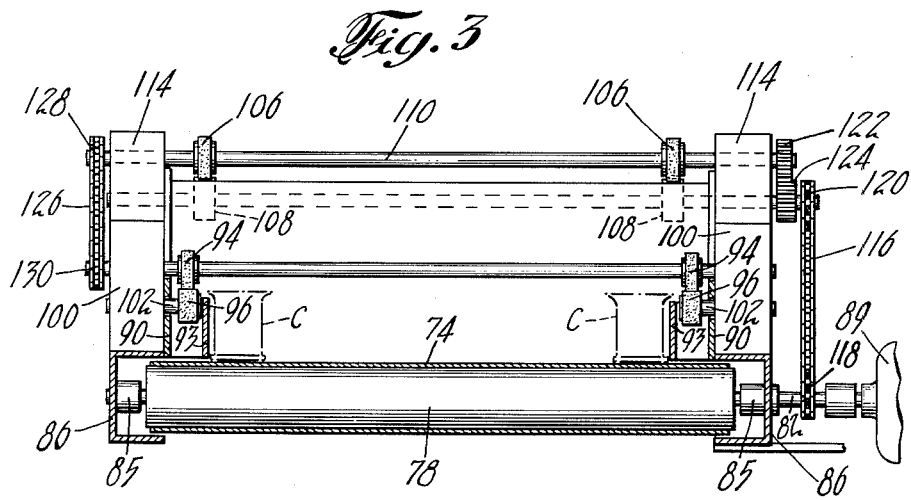
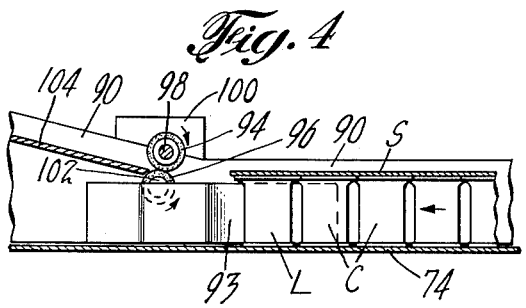
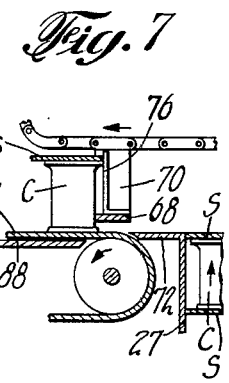
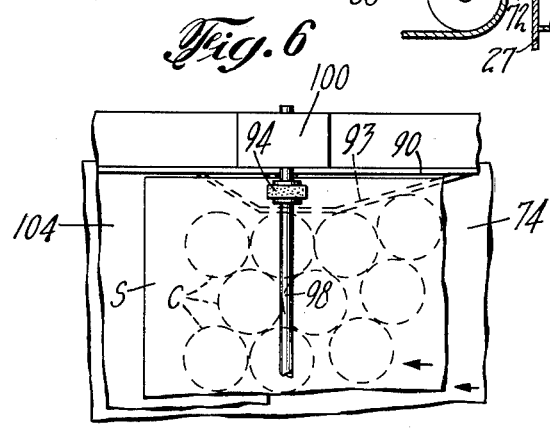
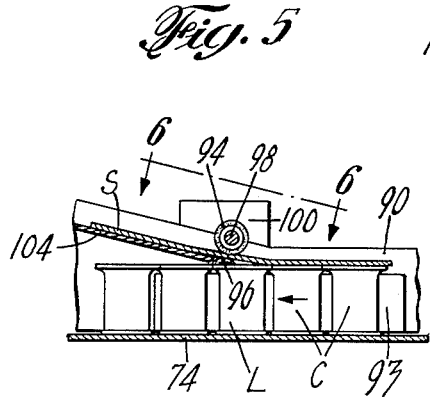

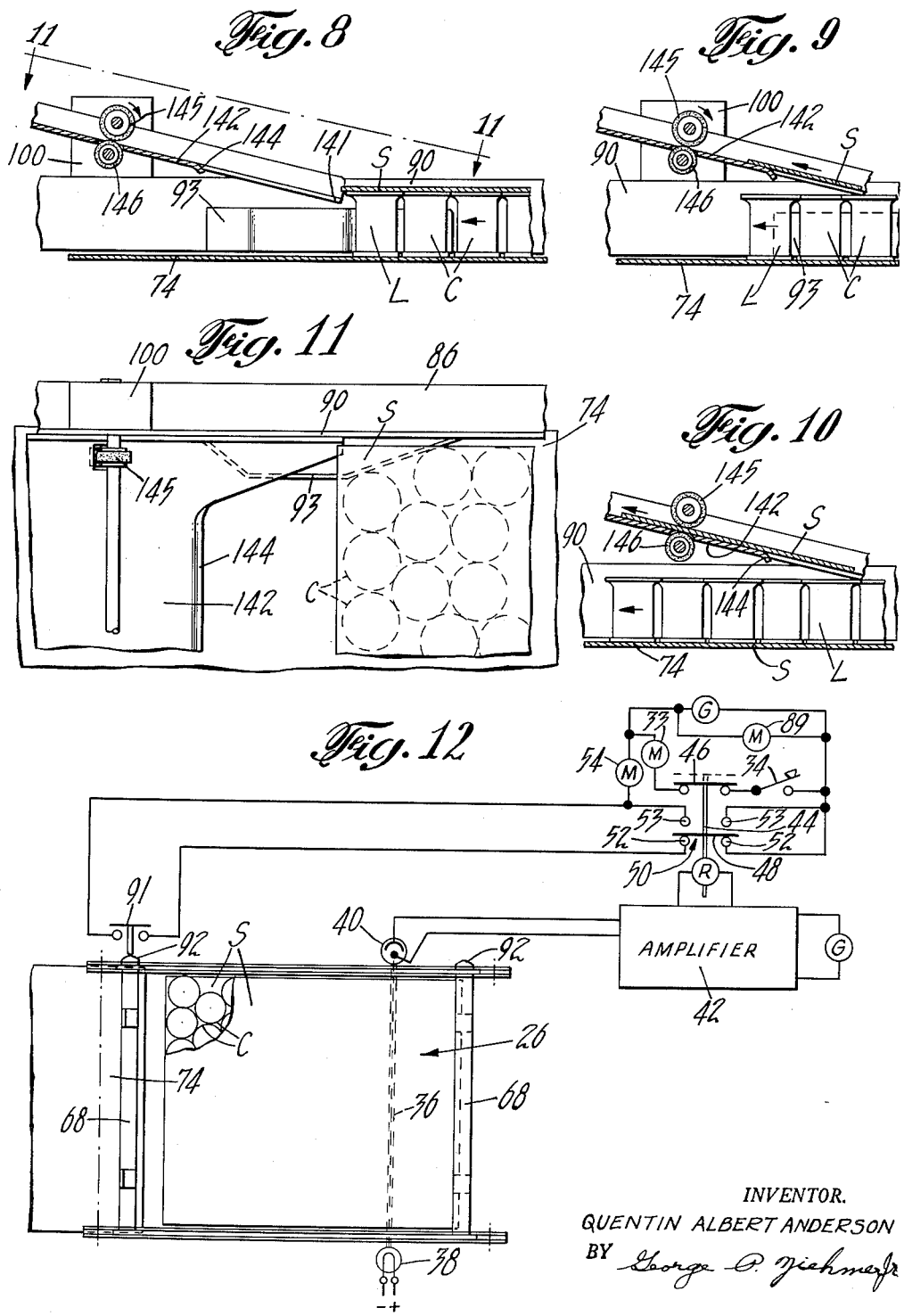

United States Patent Office 3,056,515
Patented Oct. 2, 1962

3,056,515
MACHINE FOR DEPALLETIZING CANS
Quentin Albert Anderson, Mill Valley, Calif., assignor to American Can Company, New York, N.Y., a corporation of New Jersey
Filed Jan. 29, 1959, Ser. No. 789,990
1 Claim. (Cl. 214—8.5)

The present invention relates to can depalletizing machines, and more particularly to such a machine wherein the chipboard separator sheets which are interposed between the layers of palletized cans are automatically removed as the cans are depalletized.

In the usual pallet load of cans, a chipboard separator sheet is placed on top of each horizontal layer of cans in order to provide a flat surface for the next layer to thus stabilize the load. When the cans are depalletized, the usual practice heretofore has been to remove these chipboard layers manually, although the cans themselves are swept off in a horizontal direction by a mechanical sweep bar. The need to thus manually remove these chipboard separators has been a serious inconvenience to the machine operator, since it forces him to devote a goodly portion of his time to this operation with the resultant sacrifice of attention to other, more important aspects of the unloading operation.

The present invention removes this burden from the operator by providing a mechanism which automatically removes the chipboard separator sheets from the top of each layer of cans as the layer is removed from the pallet load. This is done by leaving the separator sheet in place on each layer of cans as the layer is removed horizontally from the pallet load so that the sheet moves with the cans, and by providing a guide member on each side of the runway along which the removed cans and separator sheet are propelled as they are conveyed from the pallet load, these guide members functioning to force the side cans of each layer centrally of the runway to thereby expose the leading corners of the separator sheet so that the sheet can be intercepted and deflected upwardly onto a take away conveyor which removes it from the can layer and stacks it on a pallet to facilitate its return to the palletizing machine for reuse.

An object of the invention therefore is the provision of a machine for automatically removing separator sheets from pallet loads of cans or similar articles during the depalletizing operation to thereby relieve the operator of a time consuming chore.

Another object is to provide a simple and effective method of automatically removing such separator sheets, which method may be effected by the use of inexpensive, reliable equipment.

Numerous other objects and advantages of the invention will be apparent as it is better understood from the following description, which, taken in connection with the accompanying drawings, discloses a preferred embodiment thereof.

Referring to the drawings:

FIGURE 1 is a plan view of a can depalletizing machine embodying the principles of the instant invention, parts being broken away;

FIG. 2 is a side elevation of the machine of FIG. 1, parts being broken away;

FIG. 3 is an enlarged sectional view taken substantially along the line 3—3 of FIG. 1;

FIG. 4 is an enlarged fragmentary sectional view taken substantially along the line 4—4 of FIG. 1, with parts broken away;

FIG. 5 is a view similar to FIG. 4, but showing a later stage in the depalletizing operation wherein the separator sheet has been deflected upwardly from its normal flat position on top of a layer of cans;

FIG. 6 is a fragmentary plan view of a portion of the machine taken substantially along the line 6—6 of FIG. 5, parts being broken away;

FIG. 7 is an enlarged fragmentary sectional view taken substantially along the line 7—7 of FIG. 1, parts being broken away;

FIGS. 8, 9 and 10 are fragmentary sectional views, corresponding to FIGS. 4 and 5, of a modified form of the invention, these views illustrating in sequence how the separator sheet is deflected upwardly from the layer of cans;

FIG. 11 is a fragmentary plan view, corresponding to FIG. 5, taken substantially along the line 11—11 of FIG. 8, parts being broken away; and FIG. 12 is a fragmentary schematic plan view of the right-hand portion of the machine illustrated in FIG. 1, showing the operating controls and associated electrical circuits necessary to the operation of the machine.

As a preferred or exemplary embodiment of the instant invention, FIGS. 1–7 illustrate a can depalletizing machine formed with a main frame which includes a plurality of vertical standards 22 and a base 24.

One end of the machine, to the right as seen in FIGS. 1 and 2, comprises a pallet load receiving station 26 formed with a vertical transverse wall 27 and a pair of vertical side walls 28. A rectangular elevator platform 30 is disposed within the station 26 to provide a support for receiving a pallet load of cans C which are to be depalletized by the machine, the cans C being carried on a conventional wooden pallet P and arranged in upright position in horizontal layers L which are separated from each other by chipboard separator sheets S in order to provide stability for the pallet load. As seen in FIG. 1, the separator sheets S do not normally project outwardly any appreciable distance beyond the outer cans C in the layer L.

The elevator platform 30 is supported at each of its four corners by a lift chain 32, the four chains 32 operating around sprockets (not shown) which are mounted in the upper end of the load receiving station 26 and are rotated by any suitable means, as by a motor 33 (see FIG. 12), to elevate the platform 30 to the desired level. The particular construction of the means for elevating the platform 30 form no part of the instant invention. However, one construction which can be readily adapted to the instant machine is disclosed in United States patent to H. W. Lindgren et al., Number 2,375,241, issued May 8, 1945, and entitled "Sheet Stacking Machine." The means for elevating the platform 30 are preferably under direct control of the operator and include a push button 34 (FIG. 12) which is wired into the control circuit in series with the motor 33.

The pallet P containing the layered cans C is preferably inserted by the usual fork lift truck onto the elevator platform 30 through the open end of the receiving station 26, which is the end disposed at the right-hand side of FIGS. 1 and 2. After the load has been inserted, the operator presses down upon the push button 34 and holds it in closed position to energize the motor 33 to thus cause the elevator 30 to rise. When the load has been elevated to the desired level, its upper end intercepts a beam of light 36 which is projected from a suitable lamp 38, disposed on one side of the station 26, into a photoelectric cell 40, disposed on the other side of the station 26 (see FIGS. 1, 2 and 12). The lamp 38 and cell 40 are mounted in L-shaped plates 41, one of which is secured to each side of the upper end of the load receiving station 26.

Prior to its being intercepted by the cans C, the beam of light 36 reaches the photoelectric cell 40 and causes it to emit a current which is amplified by a conventional amplifier unit 42 and utilized to actuate the armature 44 of a double switch relay R (see FIG. 12) so that the switch 46, which is included in the elevator control circuit, which circuit also includes the elevator lift motor 33 and the push button 34, is held in closed position, as seen in solid lines in FIG. 12, thereby permitting current to flow in the circuit.

However, when the beam 36 is intercepted, current ceases to flow from the photoelectric cell 40 and the relay R is deenergized thereby moving its armature 44 to its nonactuated position, as seen in dotted lines in FIG. 12, and causing the switch 46 to open, thereby stopping the motor 33, even though the push button 34 is held in closed position. The breaking of the elevator control circuit halts the upward movement of the elevator platform 30 at a position such that the bottom ends of the topmost layer of cans C are at a predetermined level necessary to permit their removal from the load. The lamp 38 and photoelectric cell 40 are preferably vertically adjustable so that this level can be positively obtained.

The movement of the relay armature 44 also causes the arm 48 of a double contact switch 50 to move from its lowermost position, where it closes the switch contacts 52, to its uppermost position where it closes the switch contacts 53, thus energizing a second motor 54 (see FIGS. 1 and 12). The motor 54 is connected to and drives a shaft 55 which is journalled in bearings 56 which are secured to the plates 41.

The shaft 55 carries a pair of sprockets 60, one of which is mounted on each side of the station 26. A horizontally extending chain 62 operates around each sprocket 60, the opposite ends of the chains 62 operating around idler sprockets 64 which are mounted in bearings 66 secured to the plates 41.

A pair of transverse sweep bars 68 are carried between the chains 62, the bars 68 being spaced equidistantly around the chains and having their opposite ends secured to extension links 70 which comprise portions of the chains 62 and extend outwardly therefrom (see FIG. 7).

Energization of the motor 54 causes the chains 62 to move in a clockwise direction, as illustrated by the arrow in FIG. 2. This movement of the chains 62 moves the sweep bar 68 positioned on the upper flight of the chains 62 around the sprockets 64 and brings it into contact with the rearmost cans C in the topmost layer L adjacent their bottom ends, thereby sliding the whole layer L of cans C along the subjacent separator sheet S on which they are supported, onto and across a narrow horizontal shelf 72 which extends from the top of the transverse plate 27 of the station 26, and onto a constantly moving endless take away conveyor belt 74. As seen in FIG. 7, the subjacent separator sheet S, the shelf 72, and the upper flight of the belt 74 are disposed in the same plane. The upper ends of the side walls 28, which preferably extend above the topmost can layer L and its superjacent sheet S, serve as side guides to prevent the cans C in the topmost layer from spreading out as the sweep bar pressure is transmitted from can to can.

Each sweep bar 68 is provided with a pair of L-shaped fingers 76 which extend toward the chain (see FIG. 7) and engage the rear end of the subjacent separator sheet S which rests upon the upper ends of the cans C being swept from the station 26, so that the sheet S is positively set into motion by the sweep bar 68 simultaneously with the cans C.

The take away conveyor belt 74 operates around a pair of drums 78, 80 which are mounted on shafts 82, 84 which are journalled in bearings 85 secured to longitudinal channel bars 86, which are fastened to the upper ends of the vertical standards 22 of the main frame. The belt 74 is supported against sagging by a flat horizontal support plate 88 (see FIG. 7) mounted in the channel plates 86, and is continuously driven at a constant speed by a motor 89 which is connected to the shaft 82 of the drum 78 (see FIG. 1). Longitudinally extending guides 90 are provided along the sides of the belt 74 to guide the cans C and separator sheet S. The guides 90, which extend above the level of the moving separator sheet S, are secured to the channel bars 86, as best seen in FIG. 3. The belt 74 is preferably driven at the same or a slightly greater speed than are the chains 62, so that there is no crowding of the cans C as they are moved onto the belt 74 by the pusher bar 68.

As the layer L of cans C is propelled toward the belt 74 by the sweep bar 68, its trailing end moves past the lamp 38, with the result that the light beam 36 is no longer obstructed and thus reaches the photoelectric cell 40. As a result, the armature 40 of the relay R is moved to its energized position and the switch 46 is closed. This has no effect on the motor 33 since by this time the push button 34 is open, having been released by the operator. The movement of the relay armature 40 also results in the breaking of the circuit which includes the motor 54 and contacts 53. However, the motor 54 remains energized, for current continues to flow to it through an alternate circuit which includes the contacts 52 and a normally closed switch 91, disposed adjacent one of the chains 62.

Thus, the sweep bar 68 which is propelling the layer L of cans C continues its movement until a cam 92 (see FIGS. 1 and 12) carried by one of the links 70 which secures the sweep bar 68 to the chain 62, contacts the switch 91 and opens it, thus breaking the alternate circuit and stopping the motor 54, and thus also stopping the sweep bar 68, which by this time has moved into position over the belt 74 and has completed its function of transferring the cans C and separator sheets S to the belt 74, which thereafter transports them. The separator sheet S continues its movement because of its frictional contact with the upper ends of the cans C.

As the layer L of cans C and its associated separator sheet S are conveyed through the machine by the belt 74, the cans C along the side edges of the layer L are deflected inwardly toward the center of the belt 74 by means of a pair of inwardly inclined deflector plates 93 which are secured to the side guides 90 in any suitable manner. This inward movement of the side cans C removes them from beneath the side edge portions of the separator sheet S. As the sheet S moves across the top of the deflector plates 93, each of its two exposed front corners is fed into the bite of a pair of primary take away rollers 94, 96 (FIGS. 3 and 4). The constantly driven upper roller 94 of each of these pair is mounted on a cross-shaft 98, the opposite ends of which are journalled in opposed bearing standards 100 which are mounted on and extend upwardly from the side channel members 86. The lower rollers 96 are disposed in the space created between the side plates 90 and the deflector plates 93, and are idly mounted on short stud shafts 102 which are secured in the bearing standards 100 below the level of the moving separator sheet S.

As best seen in FIG. 4, the rollers 94, 96 are so mounted that their bites or points of mutual contact are located at a level higher than that of the separator sheet S. However, the curved surfaces of the lower rollers 96 which are initially contacted by the sheet S serve to lift the front edge of the sheet S and to guide it into the bites of these sets of rollers. This upward deflection of the sheet S into the rollers is clearly seen in FIG. 5. The two sets of rollers 94, 96 deliver the sheet S onto the upwardly inclined deflector plate 104 which guides them into the bites of two transversely spaced sets of secondary take away rollers 106, 108 disposed adjacent the upper end of the plate 104. As seen in FIGS. 1 and 4, the side guides 90 are extended upwardly along the deflector plate 104 to prevent skewing of the sheet S.

The upper rollers 106 and the lower rollers 108 of these sets are mounted, respectively, on shafts 110 and 112, which are journalled in a second set of opposed bearing standards 114 which are also secured to the side channel members 86 (FIGS. 1 and 2). Both sets of rollers 106, 108 are constantly driven from the motor 89 through a drive chain 116 which operates around sprockets 118, 120 secured to the shafts 82 and 112, respectively. The upper shaft 110 is rotated from the lower shaft 112 through the medium of a pair of meshing spur gears 122, 124. The rotary motion of the upper shaft 110 is transmitted to the cross-shaft 98 carrying the primary take away rollers 94 by means of a drive chain 126 which operates around sprockets 128, 130 secured to these shafts.

The separator sheets S, after being fed upwardly along the inclined runway 104 and through the secondary take away rollers 106, 108 are fed to a suitable place of deposit, which in the instant embodiment comprises a stack 131 of sheets S supported on a wooden pallet 132 (see FIGS. 1 and 2) which is supported on an antifriction roller conveyor 134. Suitable vertical guides 136 are provided to insure even stacking of the sheets S on the pallet 132. The guides 136 adjacent the lateral edges of the stacked sheets S are mounted on hinges 138 so that they can be swung upwardly to permit removal of the pallet 132 from the stacking station when the stack 131 has built up to the desired height.

The cans C, after the separator sheet S has been thus removed, continue on the belt 74 and are fed into a conventional gravity discharge chute 140 which is disposed at the far end of belt 74. The cans, in falling into the chute 140, turn 90° onto their sides and roll down the chute and into a suitable take away conveyor. The latter forms no part of the instant invention and thus is not illustrated.

After the topmost layer L has thus been removed from the pallet load, the operation is repeated on each succeeding elevated layer until the pallet P is completely empty, after which the elevator platform 30 is lowered to permit removal of the empty pallet P and the insertion of a new pallet load. Means for lowering the platform 30 have not been shown in the interest of simplicity, but one manner of accomplishing this is to make the elevator motor 33 reversible, and to provide the necessary conventional controls for reversing its operation.

FIGS. 8 through 11 disclose a modified form of the invention. In this form each exposed leading corner of the sheet is intercepted and deflected upwardly by the side edge 141 of an upwardly inclined deflector plate 142. This side edge 141 is extended downwardly into the space between each inwardly inclined deflector plate 93 and the adjacent side guide 90 so that it extends below the level of the separator sheet S, as best seen in FIGS. 8 and 11. The bottom edge of the central portion of the inclined plate 142 is provided with a curved lip 144 to prevent the separator sheet S from jamming thereagainst, since in this embodiment the sheet S may sag slightly.

The friction between the separator sheet S and its subjacent layer of cans C is relied upon to move the sheet S upwardly along the inclined plate 142 and into the bite of a set of take away rollers 145, 146, which are similar in construction and are positively driven in substantially the same manner as are the take away rollers 94, 96 of the preferred form of the invention. It will be understood that the side edge 141 and the take away rollers 145, 146 are duplicated on each side of the machine.

It will also be understood that in some instances it is not necessary to use a secondary set of take away rollers, since the primary take away rollers may be rotated at a speed sufficient to insure that the sheets are fed into the stacking station.

It is thought that the invention and many of its attendant advantages will be understood from the foregoing description, and it will be apparent that various changes may be made in the form, construction, and arrangement of the parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

In a machine for unloading discrete articles arranged in a loosely compacted layer and supporting on their upper ends of a flat flexible separator sheet substantially coextensive in area with said layer, the combination of conveyor means for advancing said layer of articles and its supported sheet along a horizontal path of travel, fixed longitudinally extending guide members on opposite sides of said path of travel for maintaining said article layer and said superposed sheet in assembled relation, a pair of inclined deflector members disposed on opposite sides of said path of travel and disposed laterally inwardly of said guide members for engaging and diverting said articles laterally inwardly on said conveyor means relative to said sheet to clear and expose the under surface of the side marginal portions of the sheet, and cooperating rotatable roller means disposed adjacent said path of article travel for engaging and gripping therebetween the exposed corners of said sheet at the leading end thereof for diverting said sheet vertically out of the path of travel of said article layer.

References Cited in the file of this patent
UNITED STATES PATENTS

| | | |
|---|---|---|
| 2,675,953 | Van Poolen | Apr. 20, 1954 |
| 2,738,912 | Kieffaber | Mar. 20, 1956 |
| 2,774,489 | Guigas | Dec. 18, 1956 |